July 31, 1962 P. E. PRITCHARD 3,047,677

MAGNETIC STEREOPHONIC PHONOGRAPH PICKUP

Filed May 20, 1958

INVENTOR:
PETER E. PRITCHARD,

BY Robert J. Mooney
HIS ATTORNEY.

United States Patent Office 3,047,677
Patented July 31, 1962

3,047,677
MAGNETIC STEREOPHONIC PHONOGRAPH PICKUP

Peter E. Pritchard, Skaneateles, N.Y., assignor to General Electric Company, a corporation of New York
Filed May 20, 1958, Ser. No. 736,603
11 Claims. (Cl. 179—100.41)

This invention relates to an improved variable reluctance magnetic phonograph pickup for reproducing sound from phonograph records, particularly stereophonic phonograph records.

By "sterophonic phonograph record" is meant a record having a V-section sound groove on the respective side walls of which are recorded the respective signals of a stereophonic pair of signals. The stereophonic pickup to be described hereinafter operates on the general principle that a single stylus or needle simultaneously and continuously tracks or engages both side walls of the sound groove of a record, but is separately modulated or translated by each side wall individually in accordance with the single signal of the stereophonic pair recorded on that respective side wall. A stereophonic variable reluctance magnetic pickup of this general character is described and claimed in the co-pending application of R. O. Dally and P. E. Pritchard, Serial No. 717,943, assigned to the assignee of the instant application, and the present invention is an improvement over the pickup described in that application.

A principal object of the present invention is to provide an improved stereophonic phonograph pickup of the variable reluctance type in which each of the recorded signals of a stereophonic pair will be reproduced with maximum fidelity and with minimum distortion of the other signal of the pair.

Another object of the invention is to provide an improved stereophonic phonograph pickup of the variable reluctance type which is suitable for playing monaural records and in which the flux change provided by movement of an armature responsive to one signal of a stereophonic pair is accompanied by a minimum of "crosstalk" or flux change of the type caused by movement of the armature responsive to the other signal of the stereophonic pair.

Another object is to provide, in a variable reluctance stereophonic phonograph pickup, an improved magnetic pole piece construction affording a high degree of discrimination between signals of a stereophonic pair.

Another object is to provide a variable reluctance stereophonic phonograph pickup including a pair of ferromagnetic cores, one for each wall of a V-section sound groove of a stereophonic record, in which the magnetic flux in each respective core is changed responsive to movement of a stylus by an associated respective wall of the record groove, and wherein flux change in either core is a minimum when the stylus is moved by the non-associated wall of the record groove.

Another object is to provide a variable reluctance phonograph pickup having a pair of respective ferromagnetic cores in which the flux is changed responsive to movement of an armature by the respective walls of a V-section record sound groove, and in which the flux change in each respective core has an optimum linearity in proportion to movement of the armature by the respective associated record groove wall.

These and other objects of the invention will be apparent from the following description taken in conjunction with the accompanying drawing wherein.

Briefly, according to the present invention, a pickup is provided in which a single ferromagnetic armature movable in separate directions by the respective walls of a V-section record groove, serves as the common flux modulating member for a pair of separate magnetic circuits including respective solenoid cores and pole pieces. The respective pole pieces are especially shaped and disposed relative to the movable ferromagnetic armature so as to maximize flux change in each pole piece responsive to armature movement by an associated respective wall of the record groove, while minimizing flux change responsive to armature movement by the other groove wall, and so as to provide optimum linearity of desired flux change versus armature movement.

Figure 1:
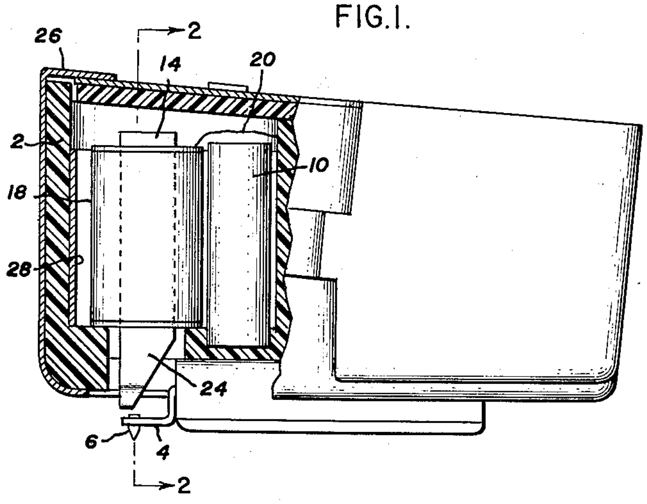
FIG. 1 is a view, partly broken away in longitudinal section, of a pickup cartridge constructed according to the present invention.

Turning now to FIG. 1, a pickup constructed in accordance with the invention includes a support or body 2 which may be of any suitable non-magnetic material such as a molded plastic, and is adapted to be mounted on the end of a phonograph tone arm in record overlying and tracking position.

The electromagnetic voltage generating system of the pickup includes a ferromagnetic armature 4 which may consist of a strip, tube or rod of ferromagnetic material. The forward end of the armature 4 is spaced below the underside of the body as shown in FIG. 1 in the normal record playing position of the pickup, and carries a depending stylus 6 having a generally conical extremity provided with a slightly rounded point adapted to engage the sound groove of a record. The armature is mounted on the body so that its forward end or stylus carrying portion is free to move in any direction in a reference plane from a neutral position corresponding to that when the stylus is engaged in the record groove at zero signal level. The reference plane is indicated by the line 2—2 of FIG. 1, and may be defined as a plane approximately coincident with the plane normal to the tangent to the record sound groove path at the point of engagement of the stylus. However, as will be recognized by those skilled in the art, the exact relationship between the reference plane and the plane normal to the sound groove at the stylus contact point may vary slightly, i.e. a few degrees, from coincidence in the vertical direction depending on the relative height of the tone arm horizontal pivot axis and the surface of a record being played, and may vary slightly from coincidence in the horizontal direction depending on the relative horizontal displacement of the tone arm vertical pivot axis and the stylus contact point on a record being played. Suitable damping means, not shown, may be provided to damp undesired vibrations of the armature at its resonant frequencies.

Figure 2:
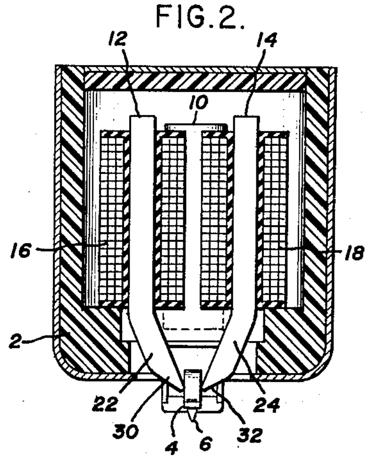
FIG. 2 is a transverse sectional view of the structure of FIG. 1, taken on the line 2—2 thereof.
Figure 3:
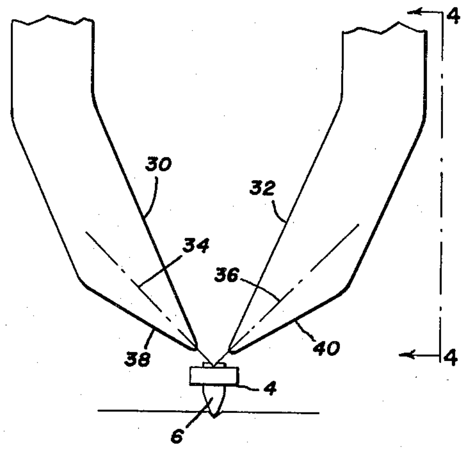
FIG. 3 is an enlarged fragmentary view of a portion of the structure shown in FIG. 2.

Fixedly supported on the body 2 adjacent the rearward end of the armature 4 is a permanent magnet 10 shown as having a generally cylindrical shape and disposed on the body with its poles spaced along a generally upright or vertically extending axis. Spaced forward of the permanent magnet and symmetrically arranged with respect to the permanent magnet and the neutral position of the armature is a pair of cores 12, 14 of ferromagnetic material which may be laminated. The cores 12, 14 are provided with respective coils or solenoid windings 16, 18 the ends of which are connected independently by leads 20 to terminals, not shown, on the body. The cores have at their lower ends depending pole pieces 22, 24 of ferromagnetic material, which may be integral with the respective cores. As best shown in FIGS. 2, and 3, the pole pieces project slightly below the underside of the body and their ends are symmetrically disposed in the reference plane above and on opposite sides of the neutral position of the stylus carrying portion of the armature. Preferably the permanent magnet is spaced from the cores by a sufficient gap of air or other low permeability material so that the density of the leakage flux from the permanent magnet passing through the air gap between the adjacent ends of the pole pieces will be less than twenty percent of the total flux linking the armature and pole pieces.

From the foregoing description it will be seen that the ferromagnetic armature 4 forms a common portion of the magnetic path of each of two separate magnetic circuits, namely that including the permanent magnet 10 and one core 12 and pole piece 22 and that including the permanent magnet and the other core 14 and pole piece 24. As previously explained the stylus is adapted to be continuously in engagement with both walls of the V-shaped record groove. As may best be seen from FIG. 3, the signal recorded in each respective wall of the record groove for which the pickup is particularly adapted is recorded as variations in the position of the wall along a line normal to the wall itself in the reference plane. Accordingly translation of the stylus responsive to a signal recorded in a particular wall produces motion of the armature in a direction normal to that wall in the reference plane. The resulting movements of the armature in the reference plane toward and away from the respective pole pieces 22, 24 produce corresponding changes in the flux passing through the respective cores, and correspondingly vary the voltages generated in the respective coils 16, 18. Preferably the body 2 may be provided with suitable ferromagnetic shields 26, and the coils may likewise have shields 28, to minimize the spurious effects of stray magnetic fields.

Figure 4:
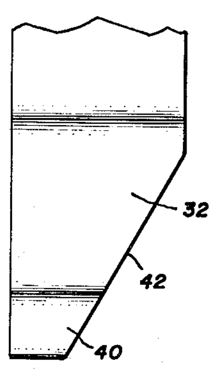
FIG. 4 is a right hand view of a part of the structure shown in FIG. 3.
Figure 5:
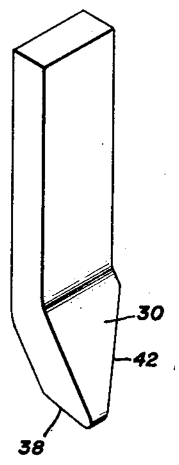
FIG. 5 is a prospective view of another part of the structure shown in FIG. 3.

Further in accordance with the invention the pole pieces of the respective cores are especially shaped and positioned so as to minimize the variation in flux in one pole piece responsive to armature movement intended to vary the flux in the other pole pieces. To this end the distal portions of the pole pieces adjacent the armature are made "quasi-conical" in shape, by which is meant these portions are tapered so as to have a cross-sectional area which progressively decreases to a minimum at their ends nearest the armature. Also, at least the distal portions of the pole pieces are mutually inwardly inclined toward the neutral position of the armature in the reference plane. Moreover, the marginal edges of the distal portions 30, 32 of the pole pieces, have a wedge shape as viewed in projection on the reference plane as shown in FIG. 3, the included angles of the wedges being approximately 20 to 60 degrees and being substantially bisected by reference lines or axes 34, 36, through the armature neutral position in the reference plane and extending generally perpendicular to the record groove walls. For the sake of simplicity in forming, measuring and assembling the pole pieces 22, 24, the above described quasi-conical shape and disposition of the distal portions of the pole pieces may be conveniently attained by providing the cores 12, 14 with bends adjacent the lowermost turns of the coils 16, 18 as best shown in FIGURES 2 and 3, in a direction inwardly toward the armature 4 from the respective axes of the coils 16, 18, and by cutting, grinding or otherwise forming beveled surfaces 38, 40 at the lower ends of the outer sides of the pole pieces, inclined inwardly and downwardly in the reference plane toward the armature neutral position. Also, to concentrate the flux paths in the pole pieces near the sylus carrying portion of the armature, where the armature movement by the record groove is greatest, the rearward and/or forward faces of the pole pieces may be beveled as shown at 42 in FIG. 4 to provide a taper toward the stylus when viewed from the side.

With the above described shape and disposition of the pole pieces, it may be seen that armature movement responsive to one wall of the record groove is substantially along the reference line of one pole piece, thereby inducing a maximum flux variation in that pole piece, while being substantially normal to the reference line or axis of the other pole piece, thereby inducing a minimum of flux variation in the other pole piece. The walls of the record groove are generally mutually perpendicular, and hence the axes 34 and 36 are mutually perpendicular, each of these axes being at an angle of 45 degrees with respect to vertical when the pickup is in playing position. Additionally it may be seen that the progressive taper of each pole piece along its reference line or axis 34, 36 toward the armature serves both to concentrate near the reference line the flux linking the armature and pole piece, while greatly weakening the flux linkages between each pole piece and the portions of the armature spaced from the reference line, thereby making each pole piece highly sensitive to armature movement along its axis and relatively insensitive to armature movement in other directions. In practice, it has been found that discrimination in flux variation in the respective pole pieces of upwards of 20 decibels can be attained over the entire audio frequency range with a pickup constructed according to the present invention. The shape and disposition of the pole pieces herein described also contributes substantially to a highly desired characteristic of the pickup, namely optimum linearity of flux change as a function of armature displacement.

In addition to pronounced insensitivity of each pole piece to armature movement by the non-associated wall of the record groove of a stereophonic record, the pickup above described has the important advantage that it is entirely compatible with and suitable for the playing of monaural records with maximum fidelity. This may be seen from the fact that movement of the armature in the horizontal direction, i.e. parallel to the plane of the record, which is the direction of movement of the stylus produced by the groove of a monaural record, can be resolved into components perpendicular to and parallel to the pole piece reference lines. For any given movement of the armature parallel to the plane of the record the motion components perpendicular to the respective pole piece reference lines 34, 36 have substantially no effect, while the motion components parallel to the respective pole piece reference lines 34, 36 produce a net increase in flux in one core and a net decrease in flux in the other core. Thus, merely by connecting the coils 16, 18 of the respective cores 12, 14 in series or parallel the electrical signals generated in each can be combined additively and the total resultant output electrical signal is accurately representative of the movement of the stylus. On the other hand, the fact that the armature is the sole moving element and is common to the two magnetic circuits means that cancellation of the signals generated in the coils responsive to motion of the stylus in a direction normal to the plane of a monaural record can be substantially complete, affording an absolute minimum of net effect on the total output of the pickup. Accordingly the pickup described is capable of monaural reproduction with maximum fidelity.

It will be appreciated by those skilled in the art that the invention may be carried out in various ways and may take various forms and embodiments other than those illustrative embodiments heretofore described. It is to be understood that the scope of the invention is not limited by the details of the foregoing description, but will be defined in the following claims.

What I claim as new and desire to secure by Letters Patent of the United States is:

1. A magnetic stereophonic phonograph pickup comprising a supporting body, a ferromagnetic armature on said body having a stylus adapted to engage simultaneously both walls of a V-section record groove, said armature being freely movable from a neutral position and in all directions in a reference plane generally perpendicular to both walls of the record groove, a pair of ferromagnetic pole pieces on said body having spaced ends situated above said armature neutral position and forming an air gap for magnetic flux linking said pole pieces and said armature, each respective pole piece having a distal portion of quasi-conical shape tapering in said reference plane and pointing toward the neutral position of said armature, a coil magnetically coupled with each respective pole piece, and a permanent magnet symmetrically disposed relative to said coils.

2. Magnetic transducer means for simultaneously reproducing signals separately recorded as displacements perpendicular to themselves of the respective walls of a V-section groove of a record comprising a supporting body, a ferromagnetic armature on said body having a stylus simultaneously engageable with both walls of the record groove and freely movable thereby from a neutral position in all directions in a reference plane generally perpendicular to both walls of the record groove, a pair of ferromagnetic pole pieces on said body having spaced ends forming an air gap for magnetic flux linking said armature and pole pieces, each respective pole piece having a distal portion of quasi-conical shape tapering in said reference plane and pointing toward the neutral position of said armature, said pole pieces being symmetrically disposed in the reference plane relative to the neutral position of said armature, a coil magnetically coupled with each respective pole piece, and a permanent magnet symmetrically disposed relative to said coils.

3. Magnetic transducer means for simultaneously reproducing signals separately recorded as displacements perpendicular to themselves of the respective walls of a 90° V-section groove of a record comprising a supporting body, a ferromagnetic armature on said body having a stylus simultaneously engageable with both walls of the record groove and freely movable thereby from a neutral position in all directions in a reference plane generally perpendicular to both walls of the record groove, a pair of ferromagnetic pole pieces on said body having spaced ends forming an air gap for magnetic flux linking said armature and pole pieces, each respective pole piece having a distal portion of quasi-conical shape tapering in said reference plane and pointing toward the neutral position of said armature and oriented generally about an axis in said reference plane substantially perpendicular to a respective wall of the record groove, said pole pieces being symmetrically disposed in the reference plane relative to the neutral position of said armature, a solenoid magnetically coupled with each respective pole piece, and a permanent magnet symmetrically disposed relative to said solenoids.

4. Magnetic transducer means as defined in claim 1 wherein the total path of low permeability material in each respective magnetic circuit formed by said permanent magnet, armature, and each respective pole piece is sufficient so that the leakage flux from said permanent magnet in the gap between the ends of the pole pieces adjacent the armature has a density less than 20 percent of the flux linking said armature and said pole pieces.

5. A stereophonic phonograph pickup for simultaneously reproducing signals separately recorded as displacements perpendicular to themselves of the respective walls of a 90° V-section groove of a record comprising a supporting body, a ferromagnetic armature on the body having a depending stylus engageable with both walls of the record groove and adapted to be freely moved thereby from a neutral position and in all directions in a reference plane substantially normal to the record groove, a pair of ferromagnetic cores having pole pieces disposed above and in laterally spaced symmetrical relation in said reference plane to the neutral position of said armature, said pole pieces having quasi-conical distal portions tapering in said reference plane and pointing toward the neutral position of said armature, a permanent magnet on the body magnetically coupled to said cores and said armature, a coil on one of the cores arranged to produce voltage variations corresponding to movement of the armature toward and away from one of the pole pieces, and a second coil on the other core arranged to produce voltage variations corresponding to movement of the armature toward and away from the other pole piece.

6. A phonograph pickup comprising a supporting body, a ferromagnetic armature on the body having a stylus carrying portion provided with a depending record-engaging stylus and adapted to be moved thereby in a reference plane substantially normal to a tangent to the path of a record sound groove, said armature stylus carrying portion being mounted for free movement in all directions in said reference plane from a neutral position, a pair of ferromagnetic cores having quasi-conical pole pieces extending downwardly and mutually inwardly toward said stylus carrying portion of said armature and forming an air gap extending parallel to said reference plane and symmetrically related to said armature neutral position, said pole pieces being tapered in said reference plane and pointing toward the neutral position of said stylus carrying portion of said armature, a coil on each core, and a permanent magnet on the body adjacent said armature.

7. A phonograph pickup comprising a supporting body, a ferromagnetic armature on the body having a stylus carrying position provided with a depending record-engaging stylus and adapted to be moved thereby in a reference plane substantially normal to a tangent to the path of a record sound groove, said armature stylus carrying portion being mounted for free movement in all directions in said reference plane from a neutral position, a pair of ferromagnetic cores having quasi-conical pole pieces extending downwardly and mutually inwardly toward said stylus carrying portion of said armature and forming an air gap extending parallel to said reference plane and symmetrically related to said armature neutral position, the distal portions of said pole pieces having wedge shaped profiles pointing toward the neutral position of said armature stylus carrying portion as viewed in projection on said reference plane, with the included angle of each wedge being approximately 20 to 60 degrees and the bisectors of the respective included angles being approximately perpendicular to the record groove side walls in the reference plane, a coil on each core, and a permanent magnet on the body adjacent said armature.

8. A phonograph pickup as defined in claim 7 wherein the total path of low permeability material in each respective magnetic circuit formed by said permanent magnet, armature, and each respective pole piece and core is sufficient so that the leakage flux from said permanent magnet in the gap between the ends of the pole pieces adjacent the armature has a density less than 20 percent of that of the total flux linking said armature and said pole pieces.

9. A phonograph pickup comprising a supporting body, a ferromagnetic armature on the body having a stylus carrying portion provided with a record sound groove-engaging stylus and adapted to be moved thereby in a reference plane substantially normal to a tangent to the path of a record sound groove, said armature stylus carrying portion being mounted for free movement in all directions in said reference plane from a neutral position, a pair of ferromagnetic cores having pole pieces disposed adjacent said stylus carrying portion of said armature and in symmetrical relation to said neutral position, said pole pieces being tapered in said reference plane and pointing toward the neutral position of said stylus carrying portion of said armature, the projection of the marginal portions of each of said pole pieces on the reference plane forming angles which are bisected by lines through the armature neutral position in the reference plane and extending generally perpendicular to the walls of the sound groove of a record engageable by the stylus, a coil on each core, and a permanent magnet mounted adjacent said armature.

10. A stereophonic phonograph pickup for reproducing signals separately recorded as displacements perpendicular to themselves of the respective walls of a 90° V-section groove of a record comprising a body member, a pair of magnetic cores mounted on the body member and having vertically extending and mutually inwardly inclined spaced pole pieces, an armature of magnetic material supported on the body member for movement by the walls of the record groove in all directions in a reference plane from a neutral position below and symmetrically related to said pole pieces and having a depending stylus adapted to engage a record groove, said reference plane being generally perpendicular to both walls of said record groove, said pole pieces being tapered in said reference plane and pointing toward said neutral position, a permanent magnet mounted on the body member in spaced relation to said cores, whereby the armature forms a portion of a first magnetic circuit including one of the cores and the permanent magnet and forms a portion of a second magnetic circuit including the other core and the permanent magnet, a coil on one of the cores arranged to produce voltage variations corresponding to flux changes in one of the pole pieces, a second coil on the other core arranged to produce voltage variations corresponding to flux changes in the other pole pieces.

11. A magnetic stereophonic phonograph pickup comprising an armature of magnetic material, said armature having a neutral position and being movable from said neutral position in all directions in a reference plane, and a pair of magnetic pole pieces spaced apart to provide a gap substantially in said reference plane and symmetrically disposed above said armature, said neutral position of the armature being spaced below said gap a distance whereby a pair of mutually perpendicular axes extending from said armature respectively toward said pole pieces will intersect the portions of said pole pieces that are respectively nearest said armature.

References Cited in the file of this patent

UNITED STATES PATENTS

| | | |
|---|---|---|
| 2,485,432 | Cornwell | Oct. 18, 1949 |
| 2,864,897 | Kaar | Dec. 16, 1958 |

OTHER REFERENCES

"How to Make a Stereo Phono Pickup," C. G. McProud, Audio, February 1958, pp. 17–19 and 40.